United States Patent [19]

Hesse et al.

[11] 4,136,912
[45] Jan. 30, 1979

[54] METHOD AND ARRANGEMENT FOR FILTERING DIGITAL, MEASURED CYCLE-DURATION VALUES, IN PARTICULAR IN ANTISKID CONTROL DEVICES ON VEHICLES

[75] Inventors: Karl-Heinz Hesse, Gehrden; Gerhard Ruhnau; Wolfgang Gudat, both of Hanover; Peter Liermann, Gehrden, all of Fed. Rep. of Germany

[73] Assignee: WABCO Westinghouse G.m.b.H., Hanover, Fed. Rep. of Germany

[21] Appl. No.: 840,460

[22] Filed: Oct. 7, 1977

[30] Foreign Application Priority Data

Oct. 14, 1976 [DE] Fed. Rep. of Germany ....... 2646375

[51] Int. Cl.² .............................................. B60T 8/00
[52] U.S. Cl. .................................... 303/91; 364/426; 364/724; 303/20
[58] Field of Search ................... 188/181; 303/20, 91, 303/95, 96, 97, 103, 105, 106, 109–111; 325/42; 328/167; 333/18, 28 R, 70 T; 364/724, 426

[56] References Cited

U.S. PATENT DOCUMENTS

| | | | |
|---|---|---|---|
| 3,518,414 | 6/1970 | Goodman et al. | 364/724 |
| 3,976,860 | 8/1976 | Gerstenmeier et al. | 364/724 |
| 4,011,438 | 3/1977 | Aufderheide et al. | 328/167 X |

*Primary Examiner*—Stephen G. Kunin
*Attorney, Agent, or Firm*—J. B. Sotak; R. W. McIntire, Jr.

[57] ABSTRACT

This disclosure relates to a method and an arrangement for filtering disturbing signals in the digital measurement of the cycle duration for an antiskid control system for motor vehicles. The detrimental influence of short disturbances on the production of control signals is suppressed by means of the filtering process. The production of the control signals takes place in accordance with the result obtained from a comparison of the respective measured value $\tau_n$ with a reference value $\tau_B$. The filtering is carried out in a manner so that when a digital measured value $\tau_n$ enters, a new reference value $\tau_{B'}$ is produced as a function of the difference between the reference value $\tau_B$ and the mean value obtained from the reference value $\tau_B$ and new measured value $\tau_n$.

36 Claims, 7 Drawing Figures

METHOD AND ARRANGEMENT FOR FILTERING DIGITAL, MEASURED CYCLE-DURATION VALUES, IN PARTICULAR IN ANTISKID CONTROL DEVICES ON VEHICLES

The invention relates to methods and arrangements for filtering digital, measured cycle-duration values, in particular in antiskid control devices on vehicles. When producing analog signals whose frequency is proportional to the rotational speed of the rotating wheel of a vehicle, and when subsequently subjecting the signals so obtained to an analog-to-digital conversion process, there may occur disturbances which may lead to adulterated measurement results. These measured values adulterated by disturbing influences would be used as the basis for the generation of the corresponding control signals and so there would be the danger of incorrect control signals being produced, which could result in incorrect pressure-control actions.

In the analog technique it is known to filter out such adulterated signals, which are superposed on the measuring signals, for instance by means of low-pass filters. Such filters cannot be used in the digital measuring technique.

Short disturbances affect the production of acceleration control signals and slip control signals in the following manner:

If in the event of two consecutive, measured cycle durations there occurs between the respective, measured values a change $\Delta\tau$ which is greater than a predetermined (admissible) change, e.g. $\tau_{B/m}$, where $\tau_B$ is a reference cycle duration and $m = 2^n$ where $n = 0, 1, 2, 3$, etc., then this leads to the production of an acceleration control signal or delay control signal (called hereinafter +b control signal). Since these control signals are produced only in arithmetic steps of a limited, predetermined duration, it is necessary to exclude the possibility of a control signal being produced within an arithmetic step. This means that the change of the measured value $\tau$ in the computing time must be less than $\tau_{B/m}$. If the next measured value is equal to the value resulting from the disturbance, the generation of the corresponding control signal should, of course, be allowed to take place, since the disturbance criterion no longer applies to this instance.

The computation of the reference cycle duration $\tau/_B$ is carried out for instance in such a manner that the reference cycle duration is adapted to the wheel cycle duration only when the wheel cycle duration becomes shorter or longer than the reference cycle duration, i.e. when the wheel speed becomes higher or lower than the reference speed.

If for example the occurrent disturbance is such that a very long cycle duration is followed by a relatively short one, then this results in the reference speed jumping upwards and the reference cycle duration jumping downwards; insofar as the reference work-cycle criterion has been met, and the reference cycle is pulled along with the distorted wheel cycle, a control signal is produced which leads to a drop in pressure. Such a disturbance may thus cause long phases during which there is no pressure.

Accordingly, the object of the invention is to prevent such disturbances from influencing the production of control signals.

This object is attained by a method for filtering disturbing signals in the digital measurement of the cycle duration in an antiskid control system for motor vehicles in order to suppress the damaging influence of short disturbances on the production of control signals which take place as determined by the result obtained from a comparison of the respective measured value $\tau_n$ with a reference value $\tau_B$, wherein the filtering is characterized by the steps of, entering a digital measured value $\tau_n$, producing a new reference cycle duration $\tau_B'$ which is a function of the difference between the reference value $\tau_B$ and a mean value, and obtaining said mean value from the reference value $\tau_B$ and the new measured value $\tau_n$.

The method is further characterized in that half the difference $(\tau_n - \tau_B/2)$ between two consecutive measured values ($\tau_B$ and $\tau_n$) $\tau_B$ and $\tau_n$, of which the corrected measured value obtained from the immediately preceding measurement ($\tau_B$) represents each time the reference value to be corrected, is added to the reference value ($\tau_B$), the result ($\tau_B + \tau_n - \tau_B/2$) forming the new reference value ($\tau_B$).

An arrangement for carrying out the above-noted method wherein a wheel sensor provides a series of signals proportional to the cycle duration, characterized by, a control unit receiving the series of signals and controlling a measurement device, the measuring device measuring the respective cycle duration ($\tau_n$), a first storage connected to the control unit accepting the respective digital cycle-duration value measured ($\tau_n$), a second storage containing the corrected measured value ($\tau_B$) obtained from a preceding measurement and representing the respective reference value, a first device forming the mean value from the respective stored values and being connected with the first and second storages, and a second device for ascertaining the difference between the reference value and the mean value, and the sum obtained from the difference and the reference value determining the new reference value.

Thus, the solution according to the invention for the above-indicated problem provides for the forming of a mean value as a 'filtering step' which does not influence a prevention of the response of a differentiator. When a disturbance occurs during an arithmetic step, it is still possible to produce a control signal immediately.

If from one measured cycle $\tau_1$ to a following measured cycle $\tau_2$ a disturbance occurs in a manner which is such that $\tau_1$ represents a lower speed and $\tau_2$ a high speed, then the increment $\tau_2 - \tau_1$ is not utilized, like this is the case without filtering, but $(\tau_2 - \tau_1)/2$. This then leads to the new cycle value $\tau_1 + (\tau_2 - \tau_1)/2$. This action of a cycle jump thus delayed does not result in the change of the cycle or speed with a constant acceleration, but the rate of change (acceleration) depends upon the degree of the cycle-duration jump and upon the cycle-duration range. When 'filtering upwards' (speed increase) a relatively strongly delayed speed variation is obtained. This means that when there occurs a short disturbance, e.g. from a speed of 10 km/h to 85 km/h (see FIG. 1), the wheel speed filtered is about 19 km/h in the next arithmetic step. Should the speed of 85 km/h be utilized as the new speed value and the reference speed be made equal to this value, then a $\Delta v$ signal would occur when the next measured value e.g. 12 km/h enters. Thus, by taking the mean value, a 'pulling up' of the reference speed is precluded. Of course, the acceleration from 10 km/h to about 18 km/h is still relatively high if a computing cycle time of 1 ms is taken as the basis for the correction time. In this instance an acceleration signal is therefore produced.

If due to a disturbance the speed jumps from e.g. 100 km/h down to 50 km/h, then, also when the cycle duration value as measured increases as a result of the forming of the mean value, there arises a very large adequate speed jump, in the present example from 100 km/h to 66 km/h. This is certainly an advantage as compared to the 'pulling up too far of the reference speed.' A one-time disturbance-induced speed jump upwards is, on the one hand, considerably delayed, while on the other hand — as soon as the actual speed value enters again — this actual speed is reached again very rapidly (for comparison, reference is had to FIG. 2).

The object as specified hereinbefore is attained by a method for filtering disturbing signals in the digital measurement of the cycle duration in an antiskid control system for motor vehicles in order to suppress the damaging influence of short disturbances on the production of control signals which takes place as determined by the result obtained from a comparison of the respective measured value $\tau_n$ with a reference value $\tau_B$, wherein the filtering is characterized by the steps of, entering a digital measured value $(\tau_n)$ and obtaining a new reference cycle duration $(\tau_B)$ which is a function of the difference $(\Delta\tau)$ between the reference value $(\tau_B)$ and the new value measured $(\tau_n)$ within predetermined cycle-duration ranges which are associated with certain speed ranges and with which certain operation factors (m) for the cycle-duration values $(\tau_B)$ are associated with which the reference value $(\tau_B)$ is compared.

An arrangement for carrying out the latter mentioned method wherein a sine-square wave converter provides a series of square-wave signals proportional to the cycle duration, characterized by, a control unit controlling a measurement device, the measurement device measuring the cycle duration of the square-wave sensor signals as a function of the measured square-wave sensor signals, a storage unit for storing the cycle-duration reference value $(\tau_n)$, a first device for comparing the reference value with predetermined cycle-duration ranges and for operating upon the reference value with operation factors (m) assigned to the cycle-duration ranges, a second device for producing the difference $(\Delta\tau)$ between the reference cycle-duration value operated upon $(\tau_B/m)$ and the cycle-duration value measured $(\tau_n)$, the second device also comparing the difference $(\Delta\tau)$ with the reference value operated upon $(\tau_B/m)$ and a multiple of this value $(\tau_B/(m/p))$ and the second device also adding in a sign-digit-accurate manner the difference $(\Delta\tau)$ or the reference value operated upon $(\tau_B/(m/p))$ to the reference value $(\tau_B)$ so as to obtain the 'filtered' new reference value $(\tau_B)$.

Thus, the solution according to the invention provides for a 'filtering' of a digital value by means of a difference-dependent correction. The value change of the reference value and measured value is made dependent upon the difference between these values and the cycle-duration range, wherein the reference value lies. The value jump is transformed or dissolved in a series of small stepwise changes succeeding each other in time, in such a manner that there arises a functional relationship between the speed curve and the time, along the lines of an e function.

In this manner, there is also obtained a 'filtering' of disturbances by delaying the speed variation over a certain time, so that, when the next actual, measured value enters, an even more rational reference value can become the basis for the further control operation.

Further solutions for the object specified above are characterized by a method for filtering disturbing signals in the digital measurement of the cycle duration in an antiskid control system for motor vehicles in order to suppress the damaging influence of short disturbances on the production of control signals which takes place as determined by the result obtained from a comparison of the respective measured value $\tau_n$ with a reference value $\tau_B$ wherein the filtering is characterized by the steps of, entering a digital measured value $\tau_n$, producing a new reference cycle duration $(\tau_B')$ which is a function of the difference between the measured value $(\tau_n)$ and the reference value $(\tau_B)$ $(\Delta\tau = \tau_n - \tau_B)$, comparing the reference value $(\tau_B)$ with certain predetermined cycle-duration ranges within associated speed ranges, assigning a fixed preset operation value (m) for the reference cycle duration, and obtaining a uniform change in the speed as a function of several preset correction times $(t_k)$ associated with the cycle-duration ranges over the total correction time.

An arrangement for carrying out the latter method according to this invention, wherein a wheel sensor provides a series of square-wave signals proportional to the cycle duration, characterized by, a measurement device measuring the respective cycle duration $(\tau)$ of the sensor signal, a storage unit in which the reference cycle-duration value $(\tau_B)$ is stored and available for recall, a comparator for comparing the reference cycle duration $(\tau_B)$ with predetermined cycle duration ranges which are associated with certain speed ranges and to which certain values are assigned which correspond to preset time intervals $(t_k)$ for a correction of the reference value $(\tau_B)$, first device for obtaining the difference $(\Delta\tau)$ between the reference value $(\tau_B)$ and the cycle-duration value measured $(\tau_n)$, a second device for dividing the reference value $(\tau_B)$ by a predetermined value so as to define a specific admissible difference between the reference value $(\tau_B)$ and the measured value $(\tau_n)$ with the difference corresponding to a speed change which lies within applicable limits, a third device for comparing the difference $(\Delta\tau)$ and the reference value operated upon $(\tau_{B/m})$, the first device for effecting a one-time or repeated sign-digit-accurate addition of either the difference $(\Delta\tau)$ or the reference value operated upon $(\tau_{B/m})$ and/or multiples of the difference or the reference value operated upon to the reference value as determined by the result of the comparison between the difference $(\Delta\tau)$ and the reference value operated upon $(\tau_{B/m})$ and by the cycle-duration range, within which the reference value $(\tau_B)$ falls and by the correction time intervals $(t_k)$ assigned to these cycle-duration ranges.

These solutions provide a 'filtering' of the measured signal essentially by varying the correction time as a function of the cycle-duration range, while the operation factor m for defining an admissible change is left constant for the whole cycle-duration range.

With this solution there is also obtained a considerably delayed speed variation which in this case approximates a straight line, however, so that in the solutions mentioned before the delay at practically a constant speed change or acceleration is not constant. Otherwise there are the same advantages as those offered by the aforementioned solutions.

THE INVENTION WILL NOW BE FURTHER EXPLAINED WITH REFERENCE TO THE ACCOMPANYING DRAWINGS WHICH SHOW EXEMPLIFIED EMBODIMENTS.

There are shown in.

Figure 1:
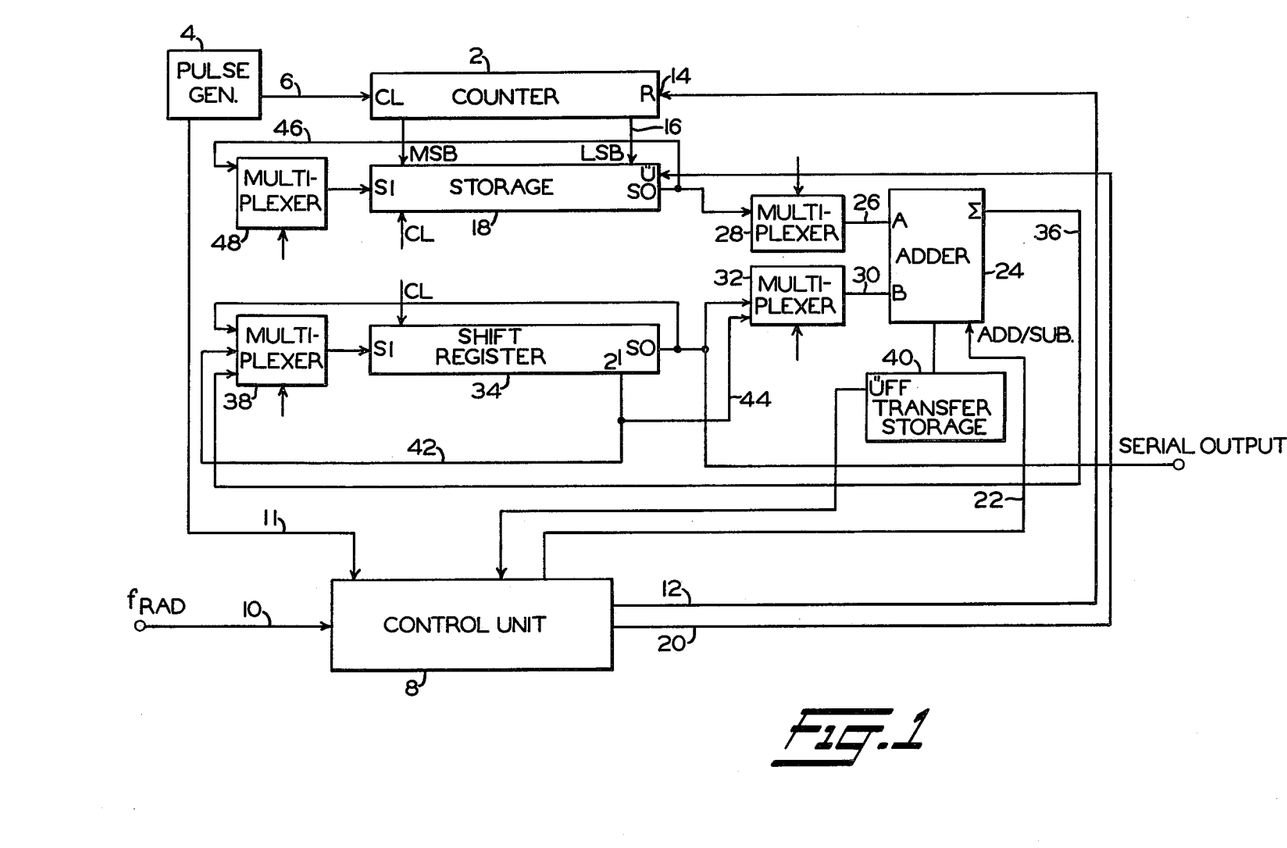
FIG. 1 a block diagram of a first specific embodiment of a circuit arrangement of the invention for 'filtering' a digital, measured cycle-duration value by means of the forming of a mean value, FIG. 2 a graphical representation, which shows the speed reduction obtainable with the invention in the case of positive speed jumps — 'simulated' by short disturbances — over several computing cycles, FIG. 3 a graphical representation which shows the speed reduction obtainable with the invention in the case of negative speed jumps — 'simulated' by short disturbances — over several computing cycles, FIG. 4 the block diagram of another specific embodiment of a circuit arrangement of the invention for 'filtering' a digital, measured cycle-duration value, FIG. 5 a graphical representation which shows by way of example the speed reduction as obtainable with the circuit of the invention in FIG. 4, FIG. 6 a circuit arrangement for carrying out a further method for 'filtering' a digital measured value in accordance with the present invention, and FIG. 7 by way of example with reference to a graphical representation, the speed reduction as obtainable with the circuit arrangement of FIG. 6 in the case of a disturbance which 'simulates' a negative speed jump from 30 km/h down to 5 km/h.

The circuit arrangement of FIG. 1 is provided with a counter 2 to which, via a line 6, high-frequency pulses are transmitted from a pulse generator 4, with a control unit 8 which, via a line 10, receives signals produced by a wheel sensor (not shown) which is normally associated with a sine-square wave converter (not shown), the repetition frequency of the signals being proportional to the wheel speed, and which, furthermore, receives, via a line 11, the pulses of the pulse generator 4.

The control unit 8 is connected by a line 12 with a reset input terminal 14 of the counter 2. The counter 2 is connected, via lines 16, with a storage 18 which in turn is connected with the control unit 8 by way of a control line 20. Furthermore, a control line 22 leads from the control unit 8 to an adder 24 which is connected with the output of the storage 18 via a line 26 and a multiplexer 28 inserted therein. The adder is further connected, via a line 30 and a multiplexer 32, with the output terminal of a shift register 34, which contains the corrected digital, measured cycle-duration value obtained from the immediately preceding measurement. The output terminal of the adder leads back to the device 34 via a summation line 36 and a multiplexer 8. Finally, there is a transfer storage 40 connected to the adder. The $2^1$ terminal of the shift register 34 leads back to the input terminal of the shift register via both the multiplexer 38 and a line 42, while also being connected with the second input terminal of the adder 24 via a line 44 and the multiplexer 32. The output terminal of the storage 18 leads back to the input terminal via a line 46 and a multiplexer 48.

The circuit functions as follows:

When receiving a high signal from the wheel sensor or from the sine-square wave converter connected thereto (not shown), the control unit 8 produces a reset pulse by which the counter 2 is reset via the reset line 12 and counts the number of pulses produced by the pulse generator 4 for the duration of a cycle, i.e. until the next high signal enters. At the end of each cycle a transfer signal is supplied to the storage 18 by the control unit 8 via the line 20, whereby the counting result is shifted from the counter 2 into the storage 18.

Thus, the storage 18 contains the cycle-duration value as measured each time, indicated hereinafter by $\tau_n$. As already mentioned before, the shift register 34 contains the respective corrected cycle-duration value, which serves as the reference value and is indicated hereinafter by $\tau_B$, obtained from the immediately preceding measurement, and which is to be corrected each time after receiving the next value measured. Subsequently, in the adder 24, the sum of the values $\tau_n$ and $\tau_B$ is obtained by means of an adding control signal supplied by the control unit 8 via the line 22 and is stored in the shift register 34. After the summed value has been received by the shift register 34, a shifting of the summed value is effected by a properly supplied shifting control signal, thus bringing about a division by 2, that is, a mean value is formed from the two values $\tau_n$ and $\tau_B$.

The division can take place in various ways. On the one hand, by recirculating the contents of the shift register, in which case the output takes place from the $2^1$ terminal instead of from the $2^0$ terminal, and the control unit blocks the multiplexer at the last shifting pulse to prevent the forming of an incorrect value. On the other hand, a one-time pulse can be produced which shifts the result present in the shift register 34 one digit to the right, thus reducing each binary digit by $2^{n-1}$. Insofar as the sum is chosen as the reference cycle duration, it is also possible to simply process the sum without dividing 2.

During the introduction of the adding arithmetic step, the cycle duration value $\tau_n$ is simultaneously stored again into the register or storage 18 via the return line 46 and the multiplexer 48.

The computation, i.e. the summation and forming of the mean value, is initiated by the transfer signal coming from the control unit 8. This method of processing is referred to as asynchronous processing. In the case of synchronous processing, in which all arithmetic operations are performed by a preset pulse occurring at fixed time intervals, it is necessary to transfer the counting result to an intermediate register. Since such an arrangement has been essentially described in the principal application, it will not be further discussed herein.

The filtered value of the cycle duration so obtained by forming the mean value is parallelly and serially available for recall from the shift register 3.

Figure 2:
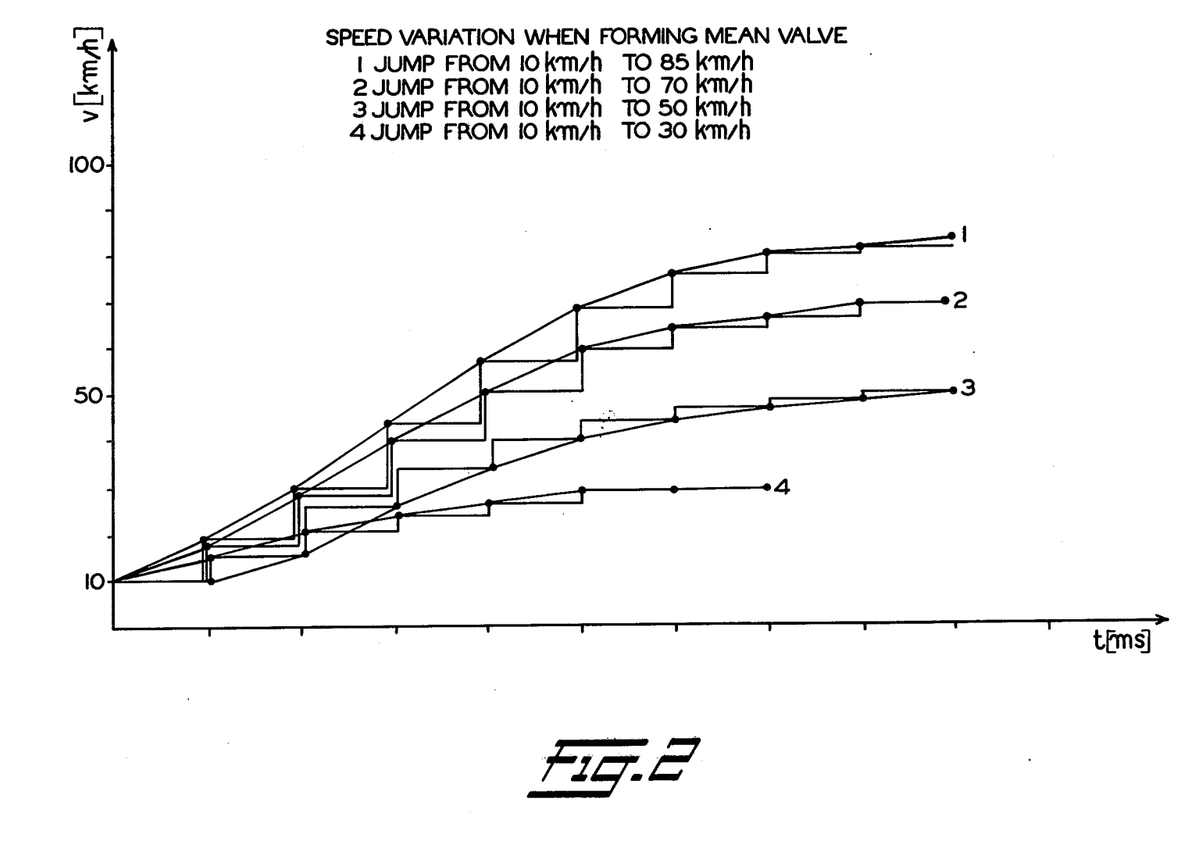

The FIGS. 2 and 3 show the manner in which a filtering of disturbances takes place by means of the invention (circuit in FIG. 1). First, reference is had to FIG. 2 which shows the delayed speed variation as obtained by the forming of a mean value in accordance with the invention. The graphical representation shows the relationships for 4 different speed jumps. For the purpose of explanation, curve 1 is considered which shows the relationships in the event of a short disturbance simulating a jump of the speed from 10 km/h to 85 km/h, in which case the time for one computing cycle of 1 ms is taken as the basis for the correction time and, for reasons of simplification, 1 is taken as the basis for the proportionality factor between the speed and the cycle duration $\tau$. It is apparent from the graphical representation that in the case of the short disturbance shown which corresponds to a speed jump from 10 km/h to 85 km/h, a relatively strongly delayed speed variation is obtained by means of the method of the invention and the arrangement for carrying out said method. As already mentioned at the beginning (introduction to the specification), when forming the mean value in accordance with the invention, the new actual reference cycle-duration value is obtained by $\tau_B + (\tau_n - \tau_B)/2$. If this filtering step is used for this short disturbance, then for the next arithmetic step (duration = 1 ms), the wheel speed value of 18 km/h is obtained. If the jump value of 85 km/h would be utilized as the new speed value and the reference speed would be made equal to this value, then there would occur a $\Delta v$ signal when the next real value, e.g. 12 km/h, enters. Thus, the 'pulling up' of the reference speed is precluded as a result of the filtering according to the invention by means of the forming of a mean value. Of course, the acceleration from 10 km/h to about 18 km/h is still relatively high if the computing cycle time of 1 ms is used as the basis for the correction time. The influence of the disturbance is, of course, considerably damped. Thus, in the case here being considered, as acceleration signal would be produced.

Figure 3:
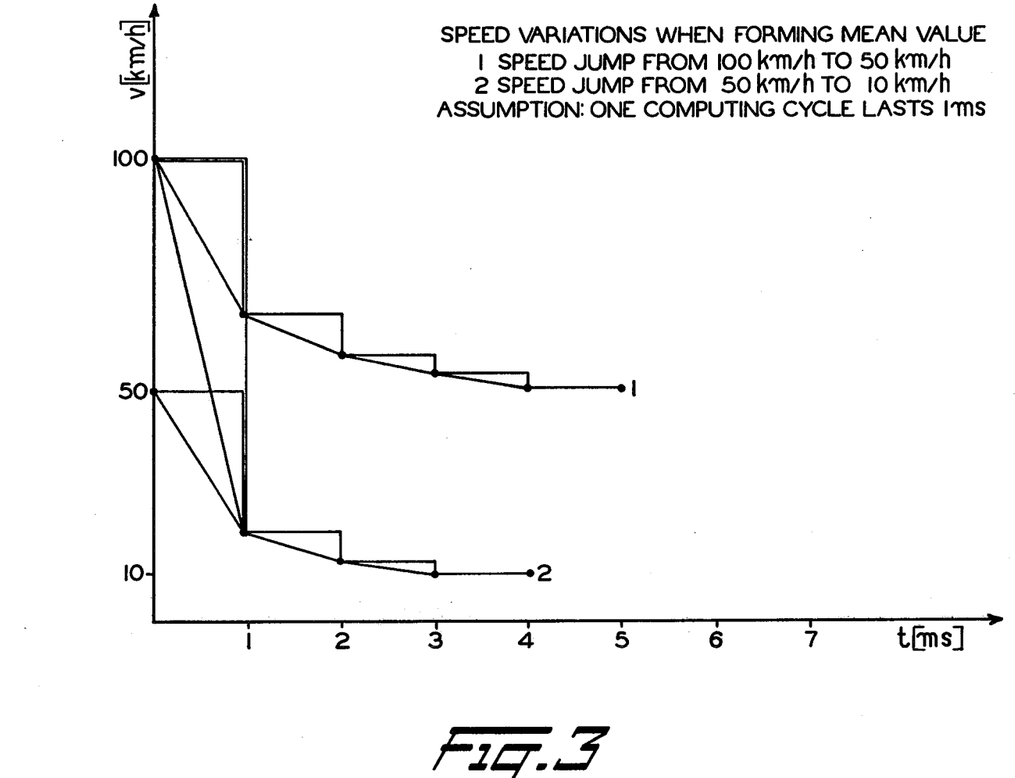

Reference is now had to FIG. 3 which shows the delayed speed variation obtained by means of the invention in the case of disturbances which 'simulate' speed jumps from 100 km/h to 50 km/h and from 50 km/h to 10 km/h. For the purpose of explanation, curve 1 is here considered as well which shows the relationships in the event of a short disturbance which corresponds to a jump of the speed from 100 km/h to 50 km/h, in which case the time for a computing cycle of 1 ms is chosen again as the correction time and 1 is chosen as the proportionality factor between the cycle duration and the speed. It is apparent from the curve 1 that in this example, in spite of a filtering from 100 km/h to 67 km/h, there occurs a relatively large, adequate speed jump. However, compared to the 'pulling up too far of the reference speed,' this is definitely an advantage. A one-time, disturbance-induced speed jump upwards is, on the one hand, considerably delayed, while, on the other hand, as soon as the real speed value enters again, this real speed is reached again very rapidly.

Figure 4:
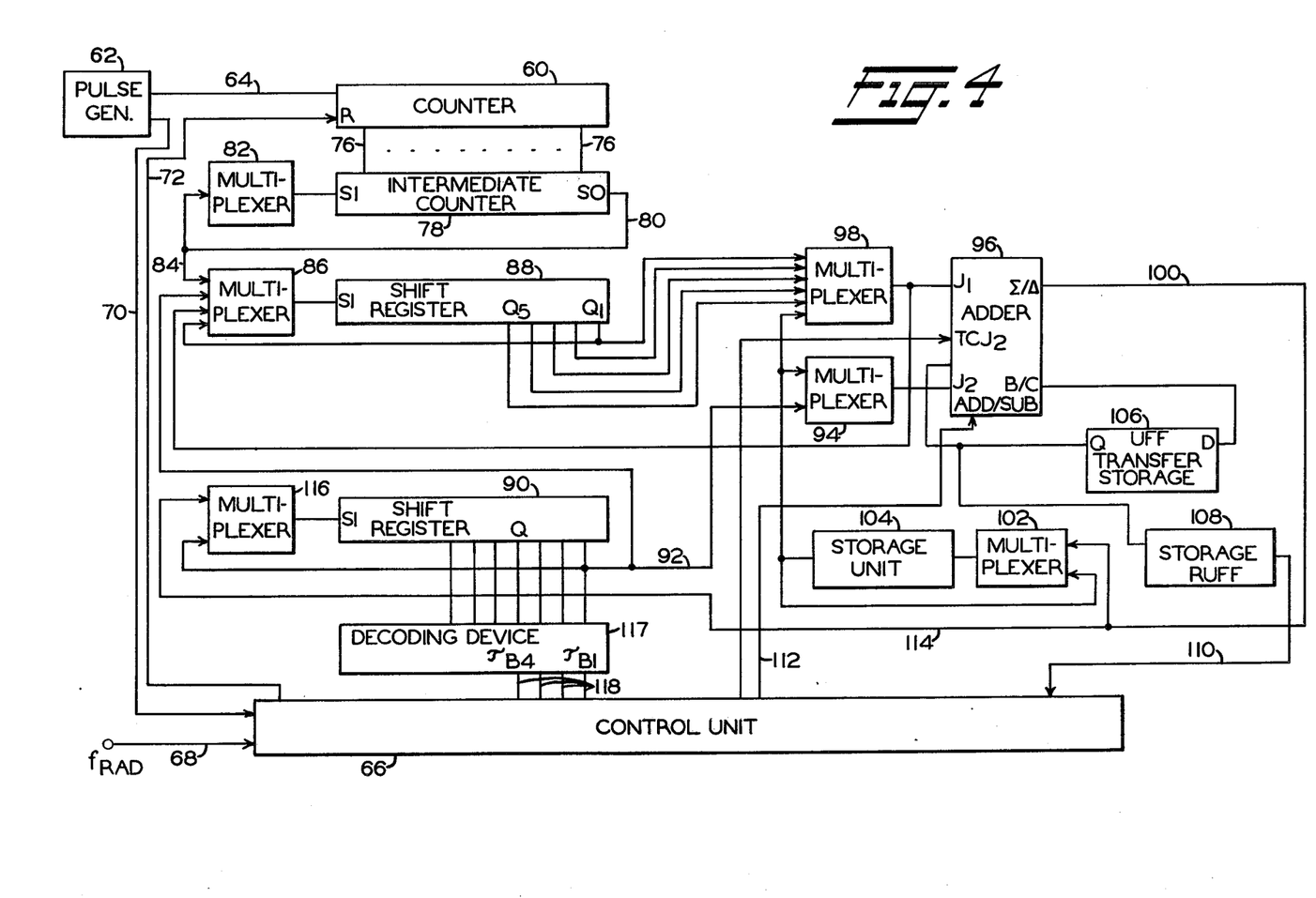

The circuit arrangement of FIG. 4 is provided with a counter 60 which, via a line 64, receives high-frequency pulses from a pulse generator 62, with a control unit 66 which, via a line 68, receives signals generated by a wheel sensor or a sine-square wave converter (not shown) associated therewith and whose repetition frequency is proportional to the wheel speed. The pulses of the pulse generator 62 are also transmitted to the control unit 66 via a line 70.

Via a line 72 the control unit 66 is connected with the reset input terminal 74 of the counter 60. The counter 60 is connected, via lines 76, with an intermediate counter 78 whose output terminal leads back to its input terminal via a line 80 and a multiplexer 82, and further to the input terminal of a shift register 88 by way of a line 84 and a multiplexer 86. The corrected, last measured value $\tau_B$ which serves as the reference value is stored in a second shift register 90. Via a line 92 and a multiplexer 94, the shift register 90 is connected with a summing input terminal $^{J}2$ of an adder 96, with the other summing input terminal $^{J}1$ of which the intermediate storage 78 and several Q output terminals of the shift register 88 are connected via a multiplexer 98. The output of the adder 96 is connected, via a line 100 and a multiplexer 102, with a storage unit 104 whose output terminal leads back to the input terminal via a multiplexer 102, and is further connected with the input terminals $^{J}1$ and $^{J}2$ of the adder 96 by way of the multiplexers 94 and 98. Furthermore, the adder 96 is connected with a transfer storage 106 and another storage 108 which is provided for preserving the transfer and whose output is connected with the control unit 66 via a line 110. In addition, an adding control line 112 leads from the control unit 66 to the adder 96 and another control line leads to the terminal $^{TC}/2$ of the adder 96. Moreover, the output of the adder 96 is connected, via a line 114 and a multiplexer 116, with the input of the shift register 90. The Q output terminals of the shift register 90 are connected with a decoding device 118 which is connected with the control unit by way of a predetermined number of lines 117.

The circuit of FIG. 4 functions as follows:

In principle, the control of the control unit and the counter takes place as in the circuit of FIG. 1. During the cycle duration time $\tau$, the counter 60 counts a quantity of pulses whose value represents a binary data word for the cycle duration $\tau$. This data word, called hereinafter $\tau_n$, is parallelly stored in the intermediate storage 78 by means of a transfer control signal coming from the control unit 66 at the end of the cycle. The control unit can recall the last cycle value $\tau_n$ from said intermediate storage at any moment. The following arithmetic steps are now carried out sequentially as controlled by the control unit 66, so as to produce a filtered value from the digital cycle-duration value $\tau_n$ measured. The corrected, filtered digital word $\tau_B$ obtained from the last measurement is present in the shift register 90. This cycle duration $\tau_B$ is initially decoded in the decoding device 118 and compared with preset cycle-duration ranges. After carrying out the comparison, a specified value, e.g. taken from 4 predetermined values associated with 4 predetermined cycle-duration ranges, is assigned to said value $\tau_B$. The values associated with the cycle-duration ranges are indicated by m. A special signal is provided via the lines 118 in accordance with the decoded cycle-duration range or the associated corresponding value m. As the next step, the difference $\Delta \tau$ is formed from the measured cycle-duration values $\tau_B$ and $\tau_n$ in the adder 96 by means of an appropriate control signal supplied by the control unit via the line 112. The difference is stored in a storage 104. Thereupon, the measured cycle-duration value $\tau_n$ is divided by the preset value m established by the decoding operation, and the result is stored in the shift register 88. The division takes place either in that, via the adder 96, the digital word $\tau_B$, to which the corresponding division by a number $2^n$ corresponds, is read out of a place Qn, or the word is read directly into the shift register 88. The measured cycle-duration value $\tau_B$ circulates during this arithmetic step.

After obtaining the result $\tau_B/m$, $\tau_B/m$ is compared with the difference $\Delta \tau$ present in the storage 104. This comparison proceeds by means of subtraction of the values of $\tau_B/m$ and $\Delta \tau$. The subtraction can take place simultaneously with the shifting out of a place. If when subtracting $\Delta \tau - (\tau_B/m)$ there is produced a transfer '1,' then $\Delta \tau$ is smaller than $\tau_B/m$, if not then $\Delta \tau > (\tau_B/m)$. If $\Delta \tau > (\tau_B/m)$, then this means that the cycle jump from arithmetic step to arithmetic step is larger than the preset maximum acceleration a of e.g. 30 g. The value $\tau_B/m$ is now added to or subtracted from the value $\tau_B$ depending on the direction, i.e. the pattern of the speed change. If for example $\Delta\tau<(\tau_B/m)$, then $\Delta\tau$ is added to $\tau_B$, which corresponds to the natural increment.

In order to obtain the approximately exponential curve, when $\Delta\tau<(\tau_B/m)$, $\tau_B/2m$ is formed and the comparison is performed as described above. In case $\Delta\tau>(\tau_B/2m)$, $\tau_B/2m$ is added. Considered from the point of view of the outlay, this method is only practical for values to $\tau_B/4m$.

In the transfer storage 106 it is now recorded whether $\Delta\tau<(\tau_B/m)$ or $\Delta\tau>(\tau_B/m)$. If the value stored in the transfer storage = '1,' then this means that $\Delta\tau<(\tau_B/m)$. In the following arithmetic step the subtraction is carried out by reading out of the shift register 88, which contains the value $\tau_B/m$, out of the place $2^1$ ($Q_1$). If the subtraction produces a transfer of '0,' then $\tau_B/2m$ is added.

If for instance in the third subtraction the transfer = '0', then $\Delta\tau$ is added. When the first comparison already produces a transfer of '0,' then the subsequent subtractions proceed without operands. This is necessary in order to obtain a fixed time expiration period since the total duration of all the arithmetic operations represents a computing cycle which in turn forms the time basis for the equation $a = \Delta\tau/t$ ($a$ = acceleration).

The control unit, which is connected, via the line 110, with the storage 108 for preserving the transfer, recognizes from the transfer whether the comparisons have ended. After two comparisons the contents of the shift register 88 is taken as the correction value, after three comparisons the contents of the storage 104, i.e. $\Delta\tau$, is taken as the correction value. As soon as the correction has been carried out, the filtered cycle-duration value is available from the shift register 90.

Figure 5:
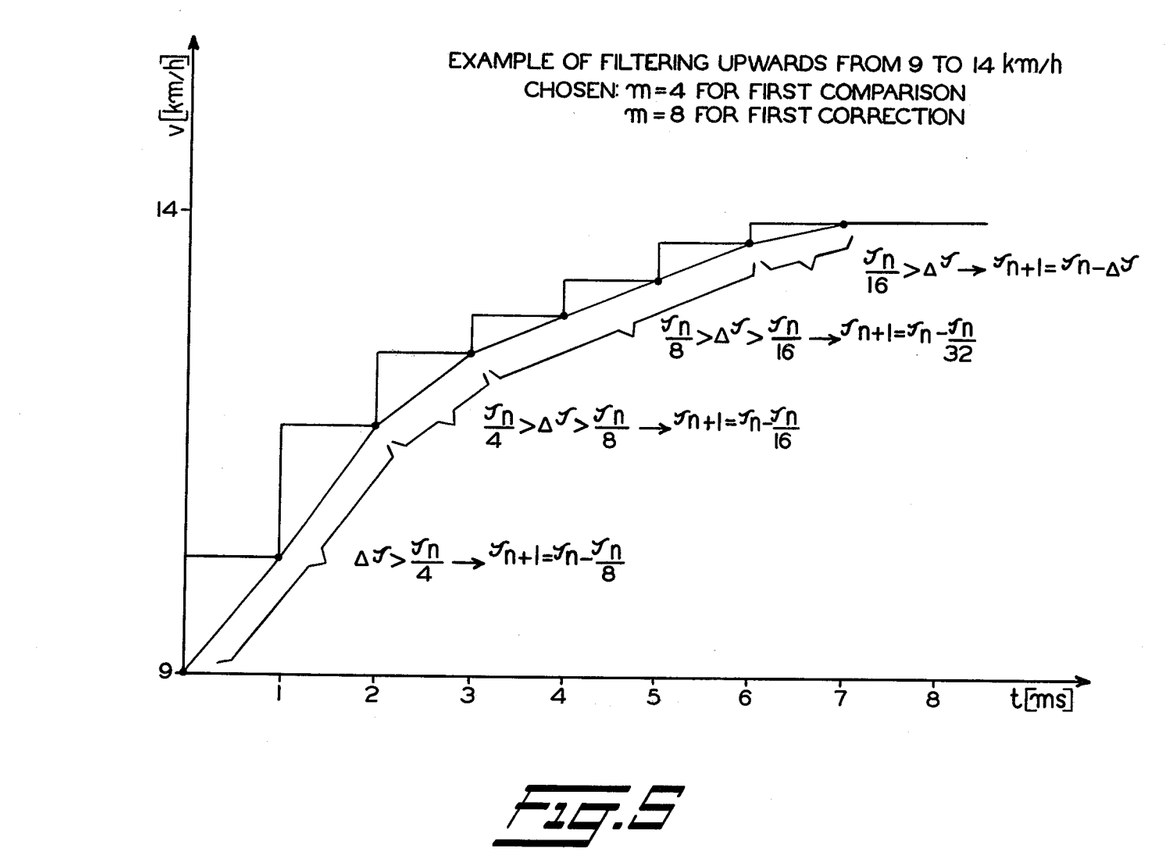

Reference is now made to FIG. 5, in which the speed reduction for a disturbance 'simulating' a jump from 9 to 14 km/h, is shown graphically, while the separate operational steps are to be listed once more so as to further clarify the correction and filtering process explained hereinbefore in accordance with the invention:

1. Forming of the digital word that represents the cycle duration,
2. Decoding of the cycle-duration measuring range from several predetermined cycle-duration measuring ranges,
3. Establishing a factor m,
4. Division of the reference cycle value $\tau_B/m$,
5. Obtaining the difference $\Delta\tau = \tau_B - \tau_n$ and storing of the sign digit,
6. Comparing as to whether $\Delta\tau>(\tau_B/m)$,
7. $\Delta\tau>(\tau_B/m)$ leads to $\tau_B' = \tau_B\pm(\tau_B/m/2)$
8. $(\tau_B/m)<\Delta\tau<\tau_B/m/2$ leads to $\tau_B' = \tau_B\pm(\tau_B/m/4)$
9. $(\tau_B/m/2)<\Delta\tau<(\tau_B/m/4)$ leads to $\tau_B' = \tau_B\pm\Delta\tau$ In the simplest case, m is chosen in such a manner that the maximum speed change corresponding to the cycle-duration change is about equal to the speed change at natural wheel behavior. To this end, in the example of FIG. 5, about thirty times the acceleration due to gravity is chosen. m is properly defined as a value from the series $2^n$, where n = 1, 2, 3, ... The value to be preset is determined by the respective decoded cycle-duration range. If in accordance with the above arrangement the comparison as per item 7 is carried out only, i.e. $\Delta\tau>(\tau_B/m)$ and $\Delta\tau<(\tau_B/m)$ become $\tau_B' = \tau_B\pm(\tau_B/m/2)$ and $\tau_B' = \tau_B\pm\Delta\tau$, respectively, then the speed $v_B$ corresponding to the reference cycle-duration value measured $\tau_B$ is adjusted with 30 g. When following the steps according to the items 7-9, there takes place approximately a simulation of the jump function in the form of an e function.

Figure 6:
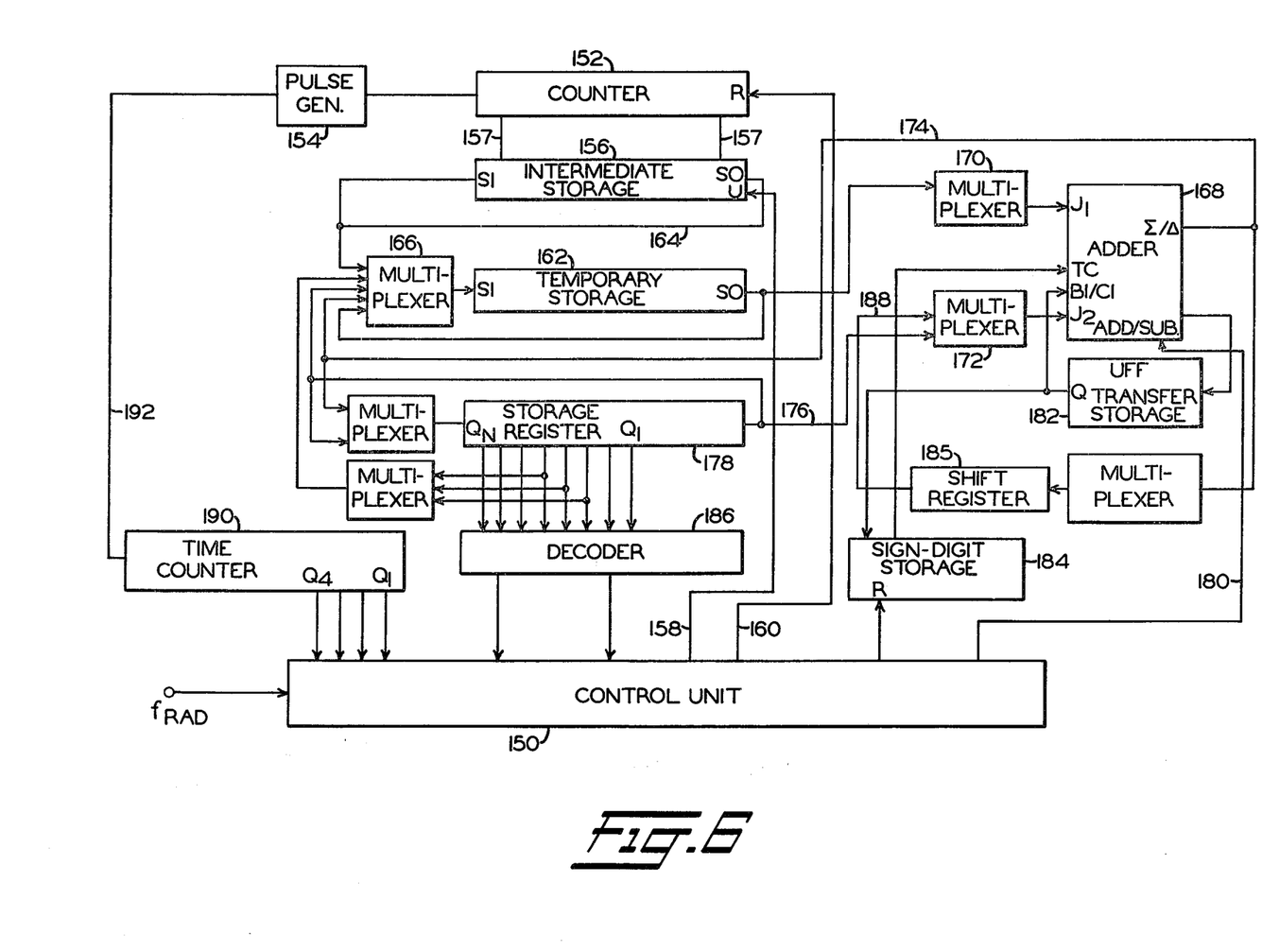

For the purpose of explaining the 'filtering process' which is the basis for the circuit in FIG. 6, and of explaining the circuit proper, the following is assumed:

In the case of the method described with reference to the FIGS. 4 and 5, in each computing cycle, which lasts a specific time, either the actual difference $\Delta\tau$ or a percentage value $\tau_B/u,m$, if $(\tau_B/u,m)>\Delta\tau$, was added to the value $\tau_B$.

In order to admit in the total cycle-duration range approximately a certain acceleration or delay, the value m is to be modified in accordance with the cycle-duration range. On behalf of the binary processing, the value m must be a multiple of 2, that is, $m = 2^n$, where $n = 1, 2, 3, ...$ If now, on the one hand, m can be modified in a constant correction time, then, on the other hand, it is also possible to keep m constant and to vary the correction time or to associate it with the cycle-duration range or speed range. Thus, in this case m is again a factor which is now fixed for all cycle-duration ranges.

The total speed range and/or cycle-duration range may be divided into, for example, 12 subranges. Since on behalf of the binary processing technique, it is advantageous to choose the individual speed ranges at a $\sqrt{2}$ interval, the following correlation arises for the number of corrections in accordance with the value m as chosen:

$$v_{n+1} = \sigma_x\left(\frac{1}{1+\frac{1}{m}}\right)^c; v_{n+1} = \sqrt{2}\,v_n$$

$$\tau_{n+1} = \left(\tau_n + \frac{\tau_n}{m}\right)^c \quad c = \frac{\log\sqrt{\frac{1}{2}}}{\log 1 + \frac{1}{m}}$$

c being the number of corrections within a speed range.

The speed ranges should not be staggered at a $\sqrt{2}$ ratio. In the range of 0–120 km/h, a ratio of 2 would also be possible, so that the speed ranges were to be staggered as $v_{h+1} = 2\,V_n$.

$$v_o = 5.34\,\frac{\text{km}}{\text{h}}$$

$$v_1 = \sqrt{2}\cdot 5.34\text{ km/h} = 7.59\text{ km/h}$$

$$\vdots$$

$$v_{10} = \sqrt{2}^g = \sqrt{2}\cdot 2^4 = 5.34 = 121.02\text{ km/h}$$

0–120 km/h being chosen as the speed range; the binary cycle-duration value $2^{14}$ then corresponds to the upper range limit of 120 km/h.

The correction times $t_k$ are then calculated:

$$t_k = \frac{\Delta v}{a} = \frac{\sqrt{2}\cdot v - v}{a} = 0\frac{\sqrt{2} - z}{a}$$

a being the speed change permitted (acceleration).
It follows that within the range 21, 39 to 30, 26 km/h $$t_k = \frac{21.39 - 0.414}{30.36} \frac{\text{km/h} \cdot s}{\text{km/h}} = 2.78 \, ms$$

The correction times are then also staggered at the ratio $$t_{k_{n+1}} = \sqrt{2} \, t_{k_n}$$

In order to keep the decoding outlay low, it proves to be practical to choose only 4 ranges within which the correction time $t_k$ is modified. It is true that in this case the limitation to a maximum acceleration as a function of the speed value would fluctuate, but, since this limiting value was chosen arbitrarily, it is allowed to deviate in an upward or downward direction.

Besides correcting the cycle-duration value measured by changing the correction times within the individual cycle-duration ranges and by changing the correction factors m, a mixed data-word correction is possible.

Thus, for instance, it is possible to choose, above the speed of 30 km/h, an m = 32 $\triangleq$ 3.12% and, below 30 km/h, an m = 16 $\triangleq$ 6.25%.

This has the advantage that the correction times as required for the lower speed range do not become too long and in the most unfavorable instance become shorter than the duration of a computing cycle which may be, for instance, 1 ms. This is for example illustrated in FIG. 7.

The circuit arrangement of FIG. 6 has, as in the case of the circuits in FIGS. 1 and 4, a control unit 150 which receives rectangular sensor signals, as well as a cycle-duration measurement device in the form of a binary counter 152 and a pulse generator 154 for producing high-frequency counting pulses.

The digital word, which is formed in the counter and corresponds to the cycle duration, is transferred to (parallelly shifted into) an intermediate storage 156 via the lines 157, after a corresponding transfer control signal has been transmitted from the control unit 150 to the intermediate storage via a line 158. Simultaneously, via a line 160, the control unit 150 transmits to the counter 152 a reset pulse which resets the counter for a new counting start.

After storing the measured value in the intermediate storage 156, the measured value is read into a temporary storage 162 via the line 164 and a multiplexer 166 (serial), while the line leads again back to the input terminal of the intermediate storage.

The input terminals of an adder 168 are connected, via multiplexers 170 and 172 and lines 174 and 176, with the temporary storage 162 which contains the new measured value $\tau_n$, with another storage 178 which contains the corrected measured value $\tau_B$ which results from the last measurement and serves as the reference value, and in addition with the control unit 150 by way of a control line 180.

The difference $\Delta\tau = \tau_n - \tau_B$ is now produced in the adder by means of an appropriate control signal supplied by the control unit 150. The sign digit of this difference, which indicates the direction of the cycle-duration variation and/or speed variation, is stored in a transfer storage 182 and a sign-digit storage 184, so as to have the sign digit available for the correction of the reference-cycle duration value $\tau_B$ to be subsequently performed to determine whether addition or subtraction is to take place. The difference $\Delta\tau$ is stored in a shift register 185.

While for the subtraction the digital values measured $\tau_n$ and $\tau_B$ are bit-serially transferred from the storages and registers 162 and 178 respectively, at the same time — the value $\tau_B$ being decoded in a decoder 186, i.e. compared with certain preset cycle-duration ranges associated with certain operation values m (m = $2^n$ where n = 1, 2, 3, ...) — $\tau_B$ is operated upon by the appropriate value m, i.e. is divided by the value m. Consequently, the quotient $\tau_B$ : m is formed in that the remaining contents of the register 178 is shifted into the register 162 via an output $Q_n$.

After this operation, in the register 185 there is $\Delta\tau$ and in the register 186 there is the reference value $\tau_B$, since the contents of the register 186 only circulates.

Subsequently, a comparison takes place to determine whether $\tau_B : m > \Delta\tau$ in that the corresponding values are transmitted from the registers 162 ($\tau_B$ : m) and 185 ($\Delta\tau$) to the adder 168 via the line 174 and a line 188, and the difference between the two values is formed. The transfer resulting from this operation, by which it is determined whether $\tau_B : m > \Delta\tau$ (contents of the storage 182 = '0') or $\tau_B : m < \Delta\tau$ (contents of the storage 182 = '1'), is stored. If in the transfer storage 182 there is the transfer '1', then this means that $\Delta\tau > \tau_B/m$, which in turn, when taking into account the conditions made at the beginning, corresponds to a speed change of over 30 g which is not to be admitted. If this circumstance should arise due to a disturbance, then the contents $\tau_B$ of the register 178 is corrected with the value $\tau_B$ : m in time intervals which correspond to the correction times $t_k$ as defined hereinbefore, by adding said value $\tau_B$: m to $\tau_B$ or subtracting it from $\tau_B$, depending on the sign digits stored in the sign-digit storage 184.

The correction times $t_k$ are then chosen in such a manner that they correspond to the condition $t_k = \Delta v/a$, and produce about a multiple of the computing cycle time.

When it is, for instance, determined the first time that $\Delta\tau > \tau_B/m$, then a time counter 190 is started which via a line 192 receives counting pulses from the pulse generator 154. The decoder 186 determines the cycle-duration range in which the contents of the register 178, i.e. the cycle-duration value $\tau_n$, lies and thus fixes the count obtained in the time counter 190, while when reaching this counting result there is produced in the control unit 150 a control signal for the addition or subtraction of the contents of the registers 162 and 178, i.e. the values $\tau_B$ : m and $\tau_B$, which is carried out in the adder 168.

As soon as a correction has taken place, the time counter 190 is reset, for instance, when the comparison between $\tau_B$ : m and $\Delta\tau$ shows that $\Delta\tau < \tau_B/m$, for $\Delta\tau$ is then always added.

If it is determined that $\Delta\tau < \tau_B/m$, then in each arithmetic step $\Delta\tau$ is added to $\tau_B$ or subtracted from $\tau_B$, according to the sign digit of $\Delta\tau$.

The corrected result, $\tau_B' = \tau_B \pm \Delta\tau$ or $\tau_B' = \tau_B \pm \tau_B/m$, is stored again, via a line 174 in the register 178 from which it can be serially or parallelly recalled.

Figure 7:
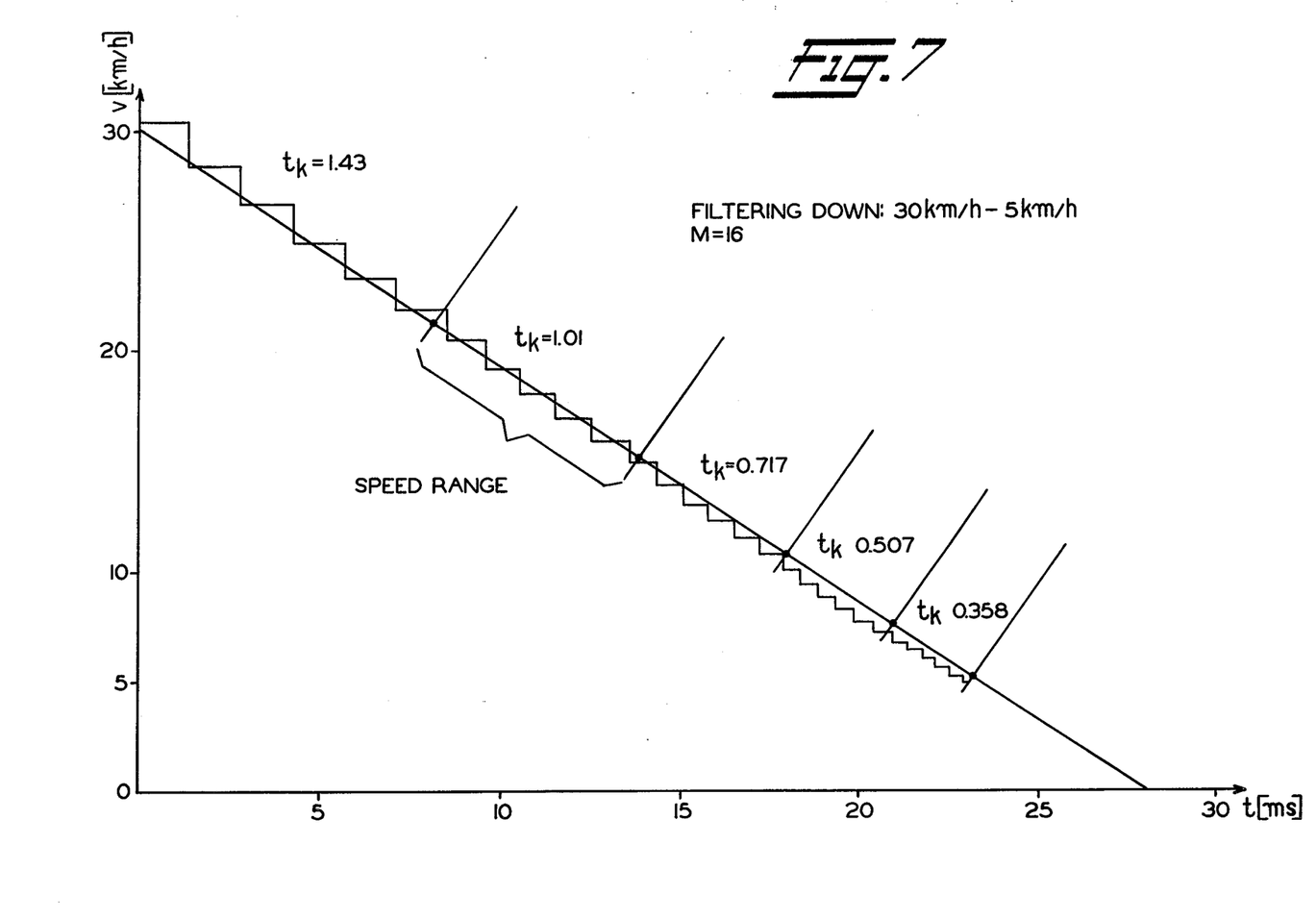

In FIG. 7, the characteristic curve for the filtering process that forms the basis for the circuit in FIG. 6, and for the circuit itself is shown for a disturbance which 'simulates' a negative speed jump from 30 km/h to 5 km/h, in which case for the value m = 16 was chosen. The speed reduction as obtained by the 'filtering process' according to the invention is clearly shown. With respect to the correction times $t_k$ indicated in the drawings, reference is made to the introductory explanations given for the description which relates to FIG. 6.

Having now described the invention, what we claim as new and desire to secure by Letters Patent, is:

1. A method for filtering disturbing signals in the digital measurement of the cycle duration in an antiskid control system for motor vehicles in order to suppress the damaging influence of short disturbances on the production of control signals which takes place as determined by the result obtained from a comparison of the respective measured value $\tau_n$ with a reference value $\tau_B$, wherein the filtering is characterized by the steps of; entering a digital measured value $\tau_n$, obtaining a mean value from the reference value $\tau_B$ and a new measured value $\tau_n$, and producing a new reference cycle duration $\tau_B$, which is a function of the difference between the reference value $\tau_B$ and the mean value.

2. A method for filtering as set forth in claim 1, further characterized by the step of; adding half the difference $(\tau_n - \tau_B/2)$ between two consecutive measured values $(\tau_B$ and $\tau_n)$ $\tau_B$ and $\tau_n$, of which the corrected measured value obtained from the immediately preceding measurement $(\tau_B)$ represents each time the reference value to be corrected, to the reference value $(\tau_B)$ with the result $(\tau_B + \tau_n - \tau_B/2)$ forming the new reference value $(\tau_B)$.

3. A method as set forth in claim 2, further characterized by the steps of; forming the mean value $(\tau_B + \tau_n/2)$ from the two respective consecutive measured values $(\tau_n$ and $\tau_B)$, obtaining from said mean value $(\tau_B + \tau_n/2)$ and the reference value which is the first corrected cycle-duration value measured $\tau_B$ the difference $(\tau_B + \tau_n/2) - \tau_B = (\tau_n - \tau_B/2)$ utilizing a change in the cycle duration to produce the control signals in that the change $(\Delta\tau)$ is added in a sign-digit-accurate manner $(\tau_B' = \tau_B + \tau_n - \tau_B/2)$ to the previous reference value $\tau_B$ so as to establish a new corrected reference value $(\tau_B')$.

4. An arrangement for filtering disturbing signals in the digital measurement of the cycle duration in an antiskid control system for motor vehicles in order to suppress the damaging influence of short disturbances on the production of control signals which takes place as determined by the result obtained from a comparison of the respective measured value $\tau_n$ with reference value $\tau_B$ wherein a wheel sensor provides a series of signals proportional to the cycle duration, characterized by, a control unit receiving the series of signals and controlling a measurement device, the measuring device measuring the respective cycle duration $(\tau_n)$, a first storage connected to the control unit accepting the respective, digital cycle-duration value measured $(\tau_n)$, a second storage containing the corrected measured value $(\tau_B)$ obtained from a preceding measurement and representing the respective reference value, a first device forming the mean value from the respective stored values and being connected with the first and second storages, and a second device for ascertaining the difference between the reference value and the mean value, and the sum obtained from the difference and the reference value determining the new reference value.

5. An arrangement as set forth in claim 4, characterized in that the first and second storages are first and second shift registers.

6. An arrangement as set forth in claim 5, characterized in that the first device for forming the mean value includes the second shift register and an adder, the adder is connected to the first storage and the second storage for forming the sum of the values present in the first and second storages and having output terminal which leads back to the second storage, so as to transfer the summed value to the second storage by introducing a shifting control signal wherein a division by 2 takes place by shifting so as to produce the mean value from the two values stored $(\tau_B$ and $\tau_n)$.

7. An arrangement as set forth in claim 4, characterized in that the measurement device includes a pulse generator for producing high-frequency pulses, and a counter for counting the high-frequency pulses which fall within the duration of a cycle.

8. An arrangement according to claim 4, characterized by, a transfer storage for storing the sign digit obtained from the difference-forming operation for ensuring the sign-digit accurate addition.

9. A method for filtering disturbing signals in the digital measurement of the cycle duration in an antiskid control system for motor vehicles in order to suppress the damaging influence of short disturbances on the production of control signals which takes place as determined by the result obtained from a comparison of the respective measured value $\tau_n$ with a reference value $\tau_B$, wherein the filtering is characterized by the steps of; entering a digital measured value $(\tau_n)$ and obtaining, a new reference cycle duration $(\tau_B)$ which is a function of the difference $(\Delta\tau)$ between the reference value $(\tau_B)$ and the new value measured $(\tau_n)$ within predetermined cycle-duration ranges which are associated with certain speed ranges and with which certain operation factors (m) for the cycle-duration values $(\tau_B)$ are associated with which the reference value $(\tau_B)$ is compared.

10. A method as set forth in claim 9, further characterized by the step of; operating upon the reference value $(\tau_B)$ in such a manner that the reference value $(\tau_B)$ is divided by the factor m associated with the cycle-duration range within which the value $(\tau_B)$ falls on account of the result obtained from the comparison.

11. A method as set forth in claim 10, further characterized by the steps of; forming the difference $(\Delta\tau)$ from the measured reference cycle-duration value operated upon $(\tau_B/m)$ which represents an admissible change in the cycle duration and the measured value newly produced $(\tau_n)$ $(\Delta\tau=\tau_B/m - \tau_n)$, comparing an absolute value of the difference $(\Delta\tau)$, with the quotient $(\tau_B/m)$ obtained from the division by m and multiple of this quotient $(\tau_B m/p)$ (p = $2^n$; n = 0, 1, 2, 3, ... ), and producing a corrected filtered, new measured reference cycle-duration value $(\tau_B')$ according to the sign digit and magnitude of the difference $(\Delta\tau)$ in the case of a negative sign digit by adding the quotient $(\tau_B/m/p)$ if it is less than the difference $(\Delta\tau)$ or the difference $(\Delta\tau)$ to the preceding reference value $(\tau_B)$ or in the case of a positive sign digit by subtracting same from the preceding reference value $(\tau_B'=\tau_B\pm\tau_B/m/p$ or $\tau_B'=\tau_B\pm\Delta\tau)$.

12. A method as set forth in claim 11, further characterized by the step of; assigning a power of two to the respective cycle-duration range so that (m = $2^n$ where n = 0, 1, 2, 3 ... ).

13. An arrangement for filtering disturbing signals in the digital measurement of the cycle duration in an antiskid control system for motor vehicles in order to suppress the damaging influence of disturbances on the production of control signals which takes place as determined by the result obtained from a comparison of the respective measured value $\tau_n$ with a reference value $\tau_B$ wherein a sine-square wave converter provides a series of square-wave signals proportional to the cycle duration, characterized by, a control unit controlling a measurement device, the measurement device measuring the cycle duration of the square-wave sensor signals as a function of the measured square-wave sensor signals, a storage unit for storing the cycle-duration reference value ($\tau_n$), a first device for comparing the reference value with predetermined cycle-duration ranges and for operating upon the reference value with operation factors m assigned to the cycle-duration ranges, a second device for producing the difference ($\Delta\tau$) between the reference cycle-duration value operated upon ($\tau_B/m$) and the cycle-duration value measured ($\tau_n$), the second device also comparing the difference ($\Delta\tau$) with the reference value operated upon ($\tau_B/m$) and a multiple of this value ($\tau_B/m/p$) and the second device also adding in a sign-digit-accurate manner the difference ($\Delta\tau$) or the reference value operated upon ($\tau_B/m/p$) to the reference value ($\tau_B$) so as to obtain the 'filtered' new reference value ($\tau_B$).

14. An arrangement as set forth in claim 13, further characterized by, an intermediate storage for storing the respective digital cycle-duration value measured coming from the measurement device and from which the measured value can be recalled.

15. An arrangement as set forth in claim 13, further characterized by, a separate storage for storing the reference value operated upon ($\tau_B/m$ or $\tau_B/m/p$).

16. An arrangement as set forth in claim 13, further characterized wherein, the first device is a decoder having decoding output terminals which are associated with the preset cycle-duration measuring ranges and which are connected with the control unit which controls the operation upon the reference values by the appropriate reference value as a function of the decoding signal.

17. An arrangement as set forth in claim 13, further characterized wherein, the second device for producing the difference ($\Delta\tau$), for comparing the difference ($\Delta\tau$) with the reference value operated upon and for adding the difference to the reference value is an adder which is controlled by the control unit.

18. An arrangement as set forth in claim 13, further characterized by, a transfer storage unit for storing the transfer resulting from the difference-forming operation between the respective value measured ($\tau_n$) and the reference value ($\tau_B$) for the sign-digit-accurate addition.

19. An arrangement as set forth in claim 13, further characterized wherein, the measurement device is a binary counter.

20. An arrangement as set forth in claim 13, further characterized by, a storage unit for storing the difference value ($\Delta\tau$) which is readily available for recall.

21. An arrangement as set forth in claim 20, characterized in that the storage units are shift registers.

22. A method for filtering disturbing signals in the digital measurement of the cycle duration in an antiskid control system for motor vehicles in order to suppress the damaging influence of short disturbances on the production of control signals which takes place as determined by the result obtained from a comparison of the respective measured value $\tau_n$ with a reference value $\tau_B$, wherein the filtering is characterized by the steps of, entering a digital measured value $\tau_n$, producing a new reference cycle duration ($\tau_B'$) which is a function of the difference between the measured value ($\tau_n$) and the reference value ($\tau_B$) ($\Delta\tau = \tau_n - \tau_B$), comparing the reference value ($\tau_B$) with certain predetermined cycle-duration ranges within associated speed ranges, assigning a fixed preset operation value (m) for the reference cycle duration, and obtaining a uniform change in the speed as a function of several preset correction times ($t_k$) associated with the cycle-duration ranges over the total correction time.

23. A method as set forth in claim 22, further characterized by the step of; dividing the reference value ($\tau_B$) by the factor (m).

24. A method as set forth in claim 22, further characterized by the step of; selecting the individual cycle-duration ranges and correction times in a specific ratio to each other, for example, in a ratio of $1 : \sqrt{2}$.

25. A method as set forth in claim 22, further characterized by the step of; multiplying the operation value by a factor of 2 ($m = 2^k$ where $k = 0, 1, 2, 3 \ldots$).

26. A method as set forth in claim 22, further characterized by the step of; providing that the correction time is a multiple of the computing time.

27. A method according to claim 26, further characterized by the step of; obtaining the value ($\tau_B/m$) by the operation upon the reference value ($\tau_B$) by the fixed preset value (m), comparing an admissible difference with the actual difference ($\Delta\tau$), in order to establish the corrected reference value ($\tau_B'$), adding the reference value operated upon ($\tau_B/m$) to the reference value ($\tau_B$) in a sign-digit-accurate manner, and repeating the addition as determined by the result of the comparison over several time intervals which correspond to the respective correction times ($t_k$) or to the times for running through of the cycle-duration ranges.

28. An arrangement for filtering disturbing signals in the digital measurement of the cycle duration in an antiskid control system for motor vehicles in order to suppress the damaging influence of short disturbances on the production of control signals which takes place as determined by the result obtained from a comparison of the respective measured value $\tau_n$ with a reference value $\tau_B$ wherein a wheel sensor provides a series of square-wave signals proportional to the cycle duration, characterized by, a measurement device measuring the respective cycle duration ($\tau$) of the sensor signal, a storage unit in which the reference cycle-duration value ($\tau_B$) is stored and available for recall, a comparator for comparing the reference cycle duration ($\tau_B$) with predetermined cycle duration ranges which are associated with certain speed ranges and to which certain values are assigned which correspond to preset time intervals ($t_k$) for a correction of the reference value ($\tau_B$), a first device for obtaining the difference ($\Delta\tau$) between the reference value ($\tau_B$) and the cycle-duration value measured ($\tau_n$), a second device for dividing the reference value ($\tau_B$) by a predetermined value so as to define a specific admissible difference between the reference value ($\tau_B$) and the measured value ($\tau_n$), with the difference corresponding to a speed change which lies within applicable limits, a third device for comparing the difference ($\Delta\tau$) and the reference value operated upon ($\tau_B/m$), m the first device for effecting a one-time or repeated sign-digit-accurate addition of either the difference ($\Delta\tau$) or the reference value operated upon ($\tau_B/m$) and/or multiples of the difference or the reference value operated upon, to the reference value as determined by the result of the comparison between the difference ($\Delta\tau$) and the reference value operated upon ($\tau_B/m$) and by the cycle-duration range, within which the reference value ($\tau_B$) falls and by the correction time intervals ($t_k$) assigned to these cycle-duration ranges.

29. An arrangement as set forth in claim 28, further characterized by, a control unit which controls both the measurement device for measuring the cycle duration and the various operations such as comparison, division and addition in the right sequence.

30. An arrangement as set forth in claim 28, further characterized wherein, the measurement device is a binary counter which is connected to a pulse generator and which counts the pulses falling within a cycle of the sensor signals as controlled by the control unit in accordance with predetermined edge conditions of the sensor signals measured.

31. An arrangement as set forth in claim 28, further characterized wherein, the comparator for comparing the reference cycle duration ($\tau_B$) with the preset cycle-duration ranges is provided with a decoder which in accordance with the cycle-duration range in which the reference value ($\tau_B$) lies shifts a time counter which is connected with a pulse generator to a position for obtaining the count which corresponds to the correction time interval ($t_k$) assigned to the cycle-duration range.

32. An arrangement as set forth in claim 28, further characterized wherein, the second device for dividing the reference value ($\tau_B$) is a shift register.

33. An arrangement forth in claim 28, further characterized wherein the storage unit for storing the reference value is a shift register.

34. An arrangement as set forth in claim 28, further characterized by, a shift register for storing the difference ($\Delta\tau$).

35. An arrangement as set forth in claim 28, further characterized by, a sign-digit storage for storing and making available the sign digit of the difference ($\Delta\tau$) for the sign-digit-accurate addition.

36. An arrangement as set forth in claim 28, further characterized by, an intermediate storage for facilitating the synchronization of the operations for the respective cycle-duration value measured.

* * * * *